US009286383B1

(12) United States Patent
Robinson

(10) Patent No.: US 9,286,383 B1
(45) Date of Patent: Mar. 15, 2016

(54) SYSTEM AND METHOD FOR SYNCHRONIZATION OF DATA AND AUDIO

(71) Applicant: Sonic Bloom, LLC, Cambridge, MA (US)

(72) Inventor: Eric D. Robinson, Cambridge, MA (US)

(73) Assignee: Sonic Bloom, LLC, Cambridge, MA (US)

( * ) Notice: Subject to any disclaimer, the term of this patent is extended or adjusted under 35 U.S.C. 154(b) by 0 days.

(21) Appl. No.: 14/471,461

(22) Filed: Aug. 28, 2014

(51) Int. Cl.
*G06F 17/30* (2006.01)
*G06F 3/0484* (2013.01)

(52) U.S. Cl.
CPC ...... *G06F 17/30743* (2013.01); *G06F 3/04842* (2013.01)

(58) Field of Classification Search
CPC .......... H04N 7/188; H04N 5/253; G06F 3/16; G06F 3/0481; G06F 17/30749; G06F 3/167; G11B 27/34
See application file for complete search history.

(56) References Cited

U.S. PATENT DOCUMENTS

| | | | |
|---|---|---|---|
| 5,655,144 A | 8/1997 | Milne et al. | |
| 5,951,646 A | 9/1999 | Brandon | |
| 6,249,091 B1 | 6/2001 | Belliveau | |
| 6,359,656 B1 | 3/2002 | Huckins | |
| 6,404,438 B1 * | 6/2002 | Hatlelid | G06F 3/033 345/473 |
| 6,408,274 B2 | 6/2002 | Tedd | |
| 6,433,784 B1 | 8/2002 | Merrick et al. | |
| 6,686,970 B1 | 2/2004 | Windle | |
| 6,696,631 B2 | 2/2004 | Smith et al. | |
| 6,737,957 B1 | 5/2004 | Petrovic et al. | |
| 7,026,536 B2 | 4/2006 | Lu et al. | |
| 7,301,092 B1 | 11/2007 | McNally et al. | |
| 7,793,208 B2 | 9/2010 | Iampietro et al. | |
| 8,006,186 B2 | 8/2011 | Kellock et al. | |
| 8,026,436 B2 | 9/2011 | Hufford | |
| 8,068,107 B2 | 11/2011 | Pirchio | |
| 8,269,093 B2 | 9/2012 | Naik et al. | |
| 8,381,086 B2 * | 2/2013 | Li et al. .................... 715/203 | |
| 8,521,533 B1 | 8/2013 | Ostermann et al. | |
| 8,591,332 B1 | 11/2013 | Bright et al. | |
| 8,606,384 B2 | 12/2013 | Kemp et al. | |
| 9,032,301 B2 * | 5/2015 | Harris ................ G06F 3/01 715/733 |
| 2001/0015121 A1 * | 8/2001 | Okamura et al. ........... 84/609 | |
| 2001/0043219 A1 * | 11/2001 | Robotham .......... G06T 7/0022 345/474 |
| 2002/0193895 A1 | 12/2002 | Qian et al. | |
| 2004/0027979 A1 * | 2/2004 | Kawashima et al. ....... 369/272 | |
| 2004/0264917 A1 | 12/2004 | Braun et al. | |
| 2005/0054440 A1 | 3/2005 | Anderson et al. | |
| 2005/0070241 A1 | 3/2005 | Northcutt et al. | |
| 2006/0020880 A1 | 1/2006 | Chen | |
| 2006/0152678 A1 | 7/2006 | Hung et al. | |
| 2007/0208571 A1 | 9/2007 | Lemieux | |

(Continued)

FOREIGN PATENT DOCUMENTS

| | | |
|---|---|---|
| EP | 1276326 A2 | 1/2003 |
| WO | 2008024486 A2 | 2/2008 |

*Primary Examiner* — Boris Pesin
*Assistant Examiner* — Mandrita Brahmachari
(74) *Attorney, Agent, or Firm* — Loginov & Associates, PLLC; William A. Loginov

(57) ABSTRACT

The present disclosure relates to a method for synchronization of audio data, such as music, with events that occur in interactive media, such as computer games. In particular, a user can define choreography data that an interactive computer application can use to synchronize to audio, such as music, one or more aspects of the application, such as the GUI, animations, rendering, sound effects, etc.

20 Claims, 12 Drawing Sheets

(56) References Cited

U.S. PATENT DOCUMENTS

| | | | |
|---|---|---|---|
| 2008/0150948 A1* | 6/2008 | Annunziata | 345/473 |
| 2008/0215979 A1* | 9/2008 | Clifton | G06F 17/30017 715/716 |
| 2009/0063159 A1 | 3/2009 | Crockett | |
| 2009/0083541 A1* | 3/2009 | Levine | 713/165 |
| 2010/0118033 A1 | 5/2010 | Faria | |
| 2010/0134501 A1* | 6/2010 | Lowe et al. | 345/474 |
| 2010/0178036 A1* | 7/2010 | Heinmiller et al. | 386/96 |
| 2011/0010624 A1 | 1/2011 | Vanslette et al. | |
| 2011/0053131 A1 | 3/2011 | Regnier et al. | |
| 2012/0102078 A1 | 4/2012 | Flick et al. | |
| 2012/0170914 A1* | 7/2012 | Brahms et al. | 386/285 |
| 2012/0234160 A1 | 9/2012 | Khoo et al. | |
| 2013/0211826 A1 | 8/2013 | Mannby | |

\* cited by examiner

SYSTEM AND METHOD FOR SYNCHRONIZATION OF DATA AND AUDIO

FIELD OF THE INVENTION

The present disclosure relates to synchronization of data and audio, in particular synchronization of audio and events in an interactive media.

BACKGROUND OF THE INVENTION

An ongoing trend in the computer and video games industry is to make the gameplay experience feel more cinematic. Much time and energy has been spent on improving realtime visual rendering systems, physics simulations, artificial intelligence modeling, dynamic audio mixing, etc. and great strides have been made in these areas.

With the exception of cutscenes, which are short films within which the player of the game in question has little to no control over, music and audio is played back in response to what the player does. In a basic implementation, the game developer may loop a background music track (BGM) for the duration of a level. In more complicated implementations, the game developer may transition the background music track to a more sinister-feeling one when the player encounters a tough enemy. In this way, the game developer subtly affects the experience, just as the composer of a movie soundtrack can play a sad note during a break up scene in a movie.

Film soundtrack composers generally write their music after filming has completed and a rough cut version of the film exists. In this way, they can plan the progression of the accompanying music to match the events and emotions of the action and actors on screen.

Unlike the film soundtrack composer, however, the game musician typically cannot know how the action will play out when the game is played by a player as the action and timing thereof is partially, if not completely, determined by the players themselves. In this way, the player acts as a kind of director. The music, however, must be completed before the game is deemed finished and allowed to reach the hands of the player. Due to this restriction, game musicians write their music in such a way as to evoke a specific emotion from the player: generally sad music for a sad part of the game, exciting music for action or battle scenes, and eerie music for scary scenes. They target an emotion or feeling with their composition, rather than specific events. This is in contrast to movie composers who write their music to align with the events on screen, accentuating specific moments or actions.

Certain prior art systems use pre-scripted sequences of events that specifically time with the background music. A horror game may have a string instrument playing an eerie note for an extended period of time, building in volume as the player approaches a door. When the player presses the button to open the door, the animation is slightly delayed such that the timing will work with the audio mix. This method puts strict limitations on how audio may be prepared and requires heavy custom work to get everything to synchronize properly. It also cannot be used in sequences involving fast-paced action as the music would have to change too quickly to be feasible for a general solution.

Another problem posed by interactive software such as computer and video games, is frequently inconsistent framerate. Framerate fluctuations and inconsistencies from computer to computer can cause serious problems with systems designed for visualizations (as appear in some prior art). If framerate drops or fluctuates enough, some events may be skipped entirely, or otherwise all triggered at once. For interactive applications, this will result in undesirable effects like multiple events appearing to happen concurrently, rather than separated out as per the source beats in the music to which the experience is being synchronized.

SUMMARY OF THE INVENTION

To overcome the disadvantages of the prior art, the present system(s) and/or method(s) provide a simple to use, event-driven design that allows disparate systems to listen for the same set of events and allow the same disparate systems to interpret the set of events as required. The present system(s) and/or method(s) also allow for multiple event sources, custom data, reliable playback (even in unstable circumstances), increased portability, and is compatible with many types of interactive media.

One aspect of the disclosure provides a method of generating choreography data, comprising: retrieving an audio file; displaying a visualization of the audio file; receiving a first user input corresponding to a start position; generating, via a processor, an event in an event track, the event having the start position; displaying a visualization of an event inline with visualization of the audio file at a position corresponding to the start position; receiving a second input indicative of a payload associated with the event; generating, via the processor, the payload corresponding to the second user input; displaying a visualization of the payload inline with the visualization of the event.

In one example, the method further includes retrieving an audio file identifier.

In one example, the method further includes displaying a visualization of a tempo map, the tempo map corresponding to a tempo of the audio file.

In one example, the method further includes generating a plurality of events; and compiling the plurality of events into the event track.

In one example, the start position comprises at least one of: a start sample value and a start time.

Another aspect of the disclosure provides a tangible non-transitory computer-readable medium having instructions stored thereon that, when executed on a processor of a computing device, cause the processor to: retrieve an audio file; display a visualization of the audio file; receive a first user input corresponding to a start position; generate an event in an event track, the event having the start position; display a visualization of an event inline with visualization of the audio file at a position corresponding to the start position; receive a second input indicative of a payload associated with the event; generate the payload corresponding to the second user input; display a visualization of the payload inline with the visualization of the event.

In one example, the processor is further configured to: retrieve an audio file identifier.

In one example, the processor is further configured to: display a visualization of a tempo map, the tempo map corresponding to a tempo of the audio file.

In one example, the processor is further configured to: generate a plurality of events; and compile the plurality of events into the event track.

In one example, the start position comprises at least one of: a start sample value and a start time Another aspect of the disclosure provides a method of using an interactive media application, comprising: receiving choreography data, the choreography data comprising at least one event and at least one payload corresponding to the at least one event; playing an audio file via an audio module; monitoring, via a choreographer module, a position of the audio file; comparing, via a processor, the monitored position of the audio file to at least one event start position corresponding to the at least one event; delivering the payload when the at least one event start position is greater than or equal to the monitored position of the audio file.

In one example, the monitored position comprises a range of a plurality of sample values corresponding to a frame of the interactive media.

In one example, the at least one event comprises a plurality of events and the at least one payload comprises a plurality of payloads.

In one example, the plurality of events each have event start positions that fall within the range of the plurality of sample values.

In one example, the payloads are displayed in an offset manner corresponding to a position offset within the range of the plurality of sample values.

BRIEF DESCRIPTION OF THE DRAWINGS

The invention description below refers to the accompanying drawings, of which.

DETAILED DESCRIPTION

The present disclosure relates to a method for synchronization of audio data, such as music, with events that occur in interactive media, such as computer games. In particular, a user can define choreography data that an interactive computer application can use to synchronize to audio, such as music, one or more aspects of the application, such as the GUI, animations, rendering, sound effects, etc.

Figure 1:
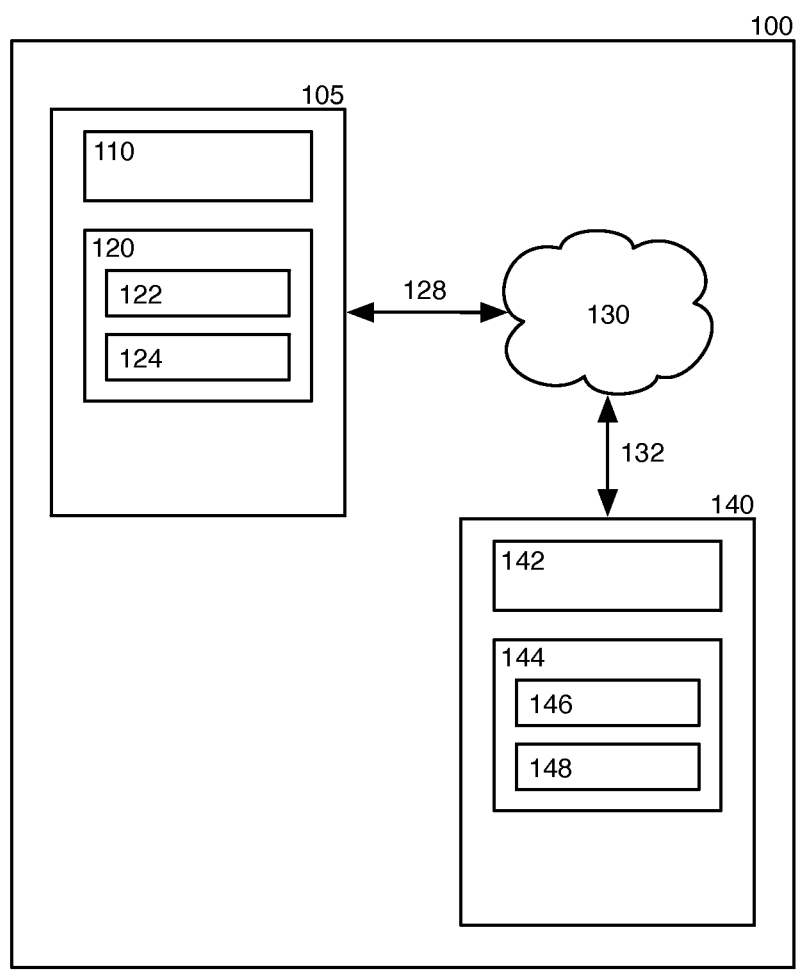
FIG. 1 is a block diagram showing a computing system according to one or more aspects of the disclosure.

FIG. 1 is a block diagram showing a computing system 100 according to one or more aspects of the disclosure. As shown, the system 100 can include a computing device 105. The computing device 105 can be any type of computing device, such as a personal computer, laptop computer, mobile device, tablet computer, etc. As shown, the computing device 105 can include a processor 110, a memory 120, and any other components typically present in general purpose computers. The memory 120 can be a tangible non-transitory computer-readable medium and can store information accessible by the processor 110, such as program instructions 122 that may be retrieved and executed by the processor and/or data 124 that may be retrieved, manipulated, or stored by the processor 110 or any other component of the computing device 105. The processor 110 can be any type of processor, such as a processor manufactured or designed by Intel®, AMD®, or ARM®. The memory 120 can be any type of memory, such as volatile or non-volatile types of memory. In particular, the memory can include one or more of the following: ROM, such as Mask ROM, PROM, EPROM, EEPROM; NVRAM, such as Flash memory; Early stage NVRAM, such as nvSRAM, FeRAM, MRAM, or PRAM, or any other type, such as, CBRAM, SONOS, RRAM, Racetrack memory, NRAM, Millipede memory, or FJG. Any of the methods, routines, procedures, steps, blocks, etc., discussed herein in the present disclosure can be implemented as a set of program instructions stored in the memory 120, such that, when executed by the processor 110, can cause the processor 110 to perform the corresponding method, routine, procedure, step, block, etc.

Although depicted as single elements in FIG. 1, the processor 110 and memory 120 can respectively comprise one or more processors and/or memory elements that can communicate by a wired/wireless connection. In this regard, the processor 110 can comprise a plurality of processors that can cooperate to execute program instructions. Moreover, the memory 120 can comprise a plurality of memories that can cooperate to store instructions and/or data.

The computing device 105 can also accept user input according to a number of methods, such as by a mouse, keyboard, trackpad, touchscreen interface, or the like (not shown). The computing device 105 can also be operably connected to a display (not shown).

The computing device 105 can also include one or more components to allow for wired or wireless communication via link 128 with any other computing device, such as server cloud 130 or computing device 140. The server cloud 130 can comprise one or more server computing devices, where such server computing devices can include similar components to those set forth with respect to device 105. Similarly, computing device 140 can include a processor 142, memory 144, instructions 146, and data 148, similar to the features set forth with respect to device 105 and can be connected directly or indirectly to computing device 105 via link 132 and server cloud 130.

Figure 2:
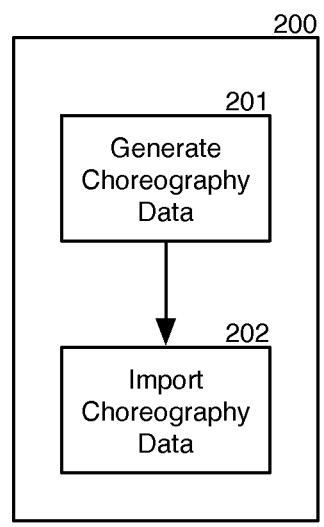
FIG. 2 depicts an overview of a method for generating and implementing choreography data according to one or more aspects of the disclosure.

FIG. 2 depicts an overview of a method 200 for generating and implementing choreography data according to one or more aspects of the disclosure. At block 201, choreography data can be generated for a selected audio file. The choreography data can be generated, for example, by an editor application with input from a user. At block 202, the choreography data can be implemented into interactive media, such as a computer game, via a runtime application. The implementation can include synchronization of one or more aspects or functions of the interactive media with the choreography data, as will be explained in greater detail below.

Figure 3:
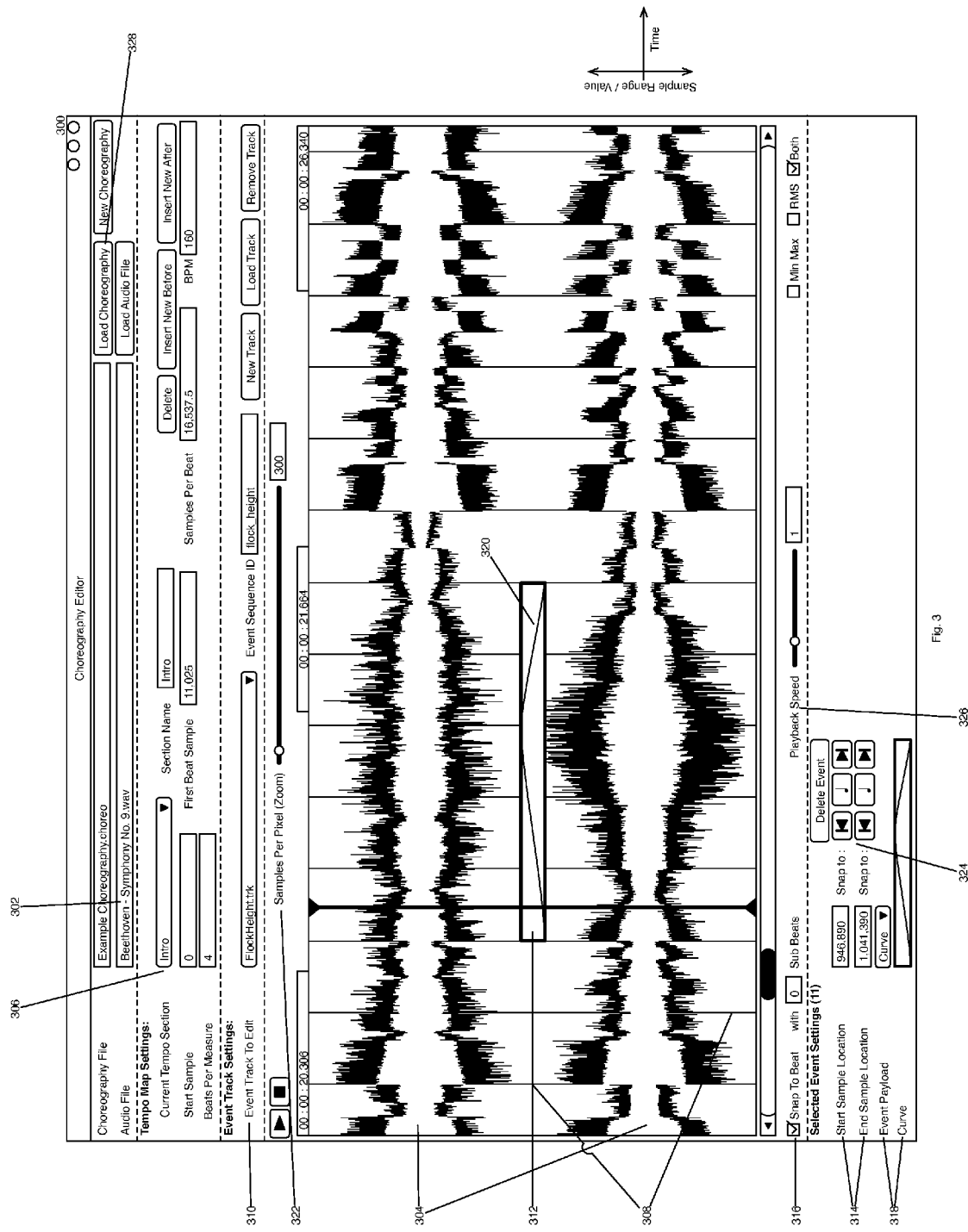
FIG. 3 depicts a graphic user interface (GUI) of an editor application that can generate choreography data according to one or more aspects of the disclosure.

FIG. 3 depicts a graphic user interface (GUI) 300 of an editor application that can generate choreography data according to one or more aspects of the disclosure. The editor application can be program instructions stored on a memory that, when executed by a processor, cause the GUI to display on a display device operably coupled to the computing device.

As shown, a user can begin by loading an audio file 302. In this example, the audio file is Beethoven's Ninth Symphony and is presented in the *.wav file format. In other examples, the audio file can be any type of audio file and can be presented in any type of audio file format, such as *.wav, *.mp3, *.mid, etc. The user may load the audio file 302 by browsing through a local directory on their local computing device or by browsing a directory of a remote computing device, such as by a wired/wireless connection.

Once the audio file 302 is loaded, a visualization 304 of the audio file can be displayed within the editor application. The visualization 304 can be in the form of a waveform that represents the audio file 302. In this example, the visualization includes separate channels for simultaneous playback, which can correspond to left and right speaker outputs. The horizontal axis H can correspond to a position within the particular audio file. While FIG. 3 depicts the position as being measured in sample values, other units or denominations representing time in an audio file can be used in the present description, such as music time, standard time (SMPTE) format, etc. The vertical axis V can correspond to waveform value, which can itself correspond directly to cone movement in a physical speaker system. With the visualization 304 displayed, a user can scroll horizontally to view other portions of the audio file, or can zoom in/out 322 on a portion of the waveform visualization for viewing.

A user can load (from a MIDI file, choreography data, custom tempo map type, etc.) or generate a tempo map 306. In doing so, the user can select a preset tempo map or can configure their own tempo map. In configuring the tempo map, the user can select a start sample, a first beat sample, samples per beat, and beats per measure. Upon configuration of the above tempo map properties with appropriate values, a visualization 308 of the tempo map can appear inline with the visualization 304 of the audio file. Such visualization 308 can include one or more vertical lines at predetermined sample values corresponding to the selected tempo map properties. This can allow a user to identify desired sample values in the music for generating choreography data, as will be discussed in greater detail below.

Figure 4:
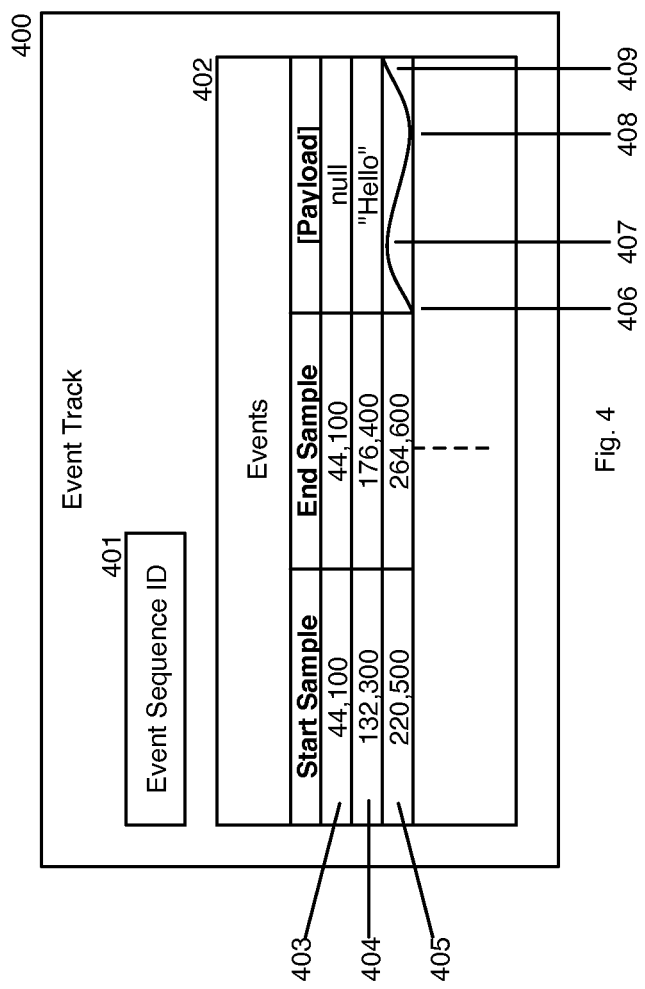
FIG. 4 is a graphical depiction of an event track according to one or more aspects of the disclosure.

A user can load or generate an event track 310. With reference to FIG. 4, which is a graphical depiction of an event track according to one or more aspects of the disclosure, an exemplary event track 400 can include an event sequence ID 401. The event sequence ID 401 can include an identifier, such as an alphanumeric string, that identifies a particular event track. The event track 400 can also include a list or sequence of events 402. For each event 403-405 in the list 402, a start position, end position, and payload are identified. As described above, the start position and end position can be represented according to any number of units or denominations representing time, such as sample values, music time, SMTPE, etc. The start sample and end sample values correspond to sample values in the associated audio file and can represent the start time and end time of a particular event 403-405 in the event track 400. The payload identifies an action, function, or feature that can take place at a particular sample value, or for at least a portion, or the entire, span of the sample time. The payload can include a string, a number, an animation curve, an image, a graphics shader, etc. or any combination thereof. For example, for event 403, the start sample value of 44,100 is identical to the end sample value of 44,100. In this regard, the sample span of the event 403 has a value of 0. The payload for the event 403 is null, meaning that no payload will be attached to the event.

For event 404, the start sample value is 132,300 and the end sample value is 176,400. In this regard, the span of event 404 is 44,100. During event 404, a payload of "Hello" can be delivered. In this regard, the message "Hello" can be displayed to a user while viewing/interacting with an interactive media, such as a computer game.

For event 405, the start sample 220,500 and the end sample 264,600 results in a sample span of 44,100 with a payload function being delivered during that span. The payload function is represented as a plot of a sine curve, as shown in FIG. 4. The payload function can modify an aspect of the interactive media for a particular payload function value at a particular sample. For example, the payload function can modify a value of the audio track during the span of the event. At sample point 406 of the payload function, the payload function can modify the audio to have minimum volume. At sample point 407, the payload function can modify the audio to have a maximum volume. Similarly, sample points 408 and 409 represent volume minima and maxima, respectively. The result is that the volume of the audio file increases, decreases, and increases again according to the sine values of the curve. In addition to volume, the payload function can adjust or modify other aspects or properties of the interactive media, such as the position, color, etc. of a visual element on or off screen, the speed of time in the interactive media, the intensity of haptic feedback, such as a rumble feature of a connected input device, etc.

While events 403-405 are depicted as not overlapping, it is contemplated that an event track can have a plurality of events and that some of the events can overlap in sample value. In this regard, the respective payloads of the overlapping events can be delivered simultaneously.

Referring again to FIG. 3, a user can select a portion of the visualization for the purpose of creating an event. Such portion can include a single sample value or a span of sample values. In FIG. 3, an event 312 is shown inline with the visualization of the audio file. In this example, the event represents a start sample and end sample of 946,890 and 1,041,390, respectively. As shown, the event 312 begins and ends approximately in line with beats of the tempo track visualization 308. To this end, a user may select Snap To Beat 316 to allow the event to snap to the tempo track visualizations when the user is selecting in the vicinity of the beats of the tempo map visualization. This is also known as quantization. A user may select a button 324 to adjust the start/end sample values to the nearest beat of the tempo track.

A user may create an event 312 according to any number of methods, such as by an input device, such as a mouse, to identify a sample location in the audio file waveform visualization at which to create a new event. The mouse may be dragged to specify the duration of the event along the associated audio timeline. In another embodiment, the user may play the audio and indicate the location and duration while listening to the audio. This may be accomplished through an input device such as a keyboard, wherein one example may include pressing the spacebar to mark the beginning of an event and releasing the spacebar to mark the end. The audio playback speed could be adjusted at toggle 326 to enhance the selection process. Yet another embodiment could allow the user to import MIDI data associated with the loaded audio file. The MIDI events could then be converted into event tracks and events which the user could then customize. In another embodiment, the editor may employ automated wave data analysis to detect likely event locations and create event recommendations.

The event 312 is depicted as having a span of 94,500. In other examples, events that have a span of 0 samples, such as event 403 above, can be visualized in the GUI as a vertical line. Otherwise, the event 312 may be visualized as a rectangular box inline with the visualization of the audio file. In this example, the visualization 304 includes two channels and includes respective visualizations for each. In this regard, the event 312 can be displayed between the visualizations 304 of any number of channels, waveforms, visualizations, etc.

The event 312 can have a start/end sample value 314, and can have event payload data 318. In the example of FIG. 3, the payload data comprises a curved payload function. The user may select preselected payload functions or can generate their own payload function.

With the event 312 being displayed in the visualization of the audio file, a visualization 320 of the payload can be simultaneously displayed therewith. In this example, the visualization 320 of the payload depicts a curved payload that shows corresponding payload values along the span of the event. As shown, the event 312 can be depicted as a rectangular box and the visualization 320 of the payload can be at least partially contained therein. The visualization 320 of the payload represents specific payload values along the horizontal axis that correspond to specific sample values of the audio file. Returning to the volume example described above, a user can visually observe the modification a payload makes to volume in the context of the overall sample values of the audio file and/or the visualization of the audio file. Once the events and payloads are configured, the data can be saved into a choreography data file 328 which can be reloaded by the editor application at a later date.

While the above describes creation of an event track, pre-generated event tracks can be loaded. When such an event track is loaded, the visualizations corresponding to the events in the track can be displayed in the audio file visualization without further manipulation by the user. Moreover, the payload can be displayed within the selections, as described above. Further, a user may simultaneously load multiple event tracks into the editor application.

Figure 5:
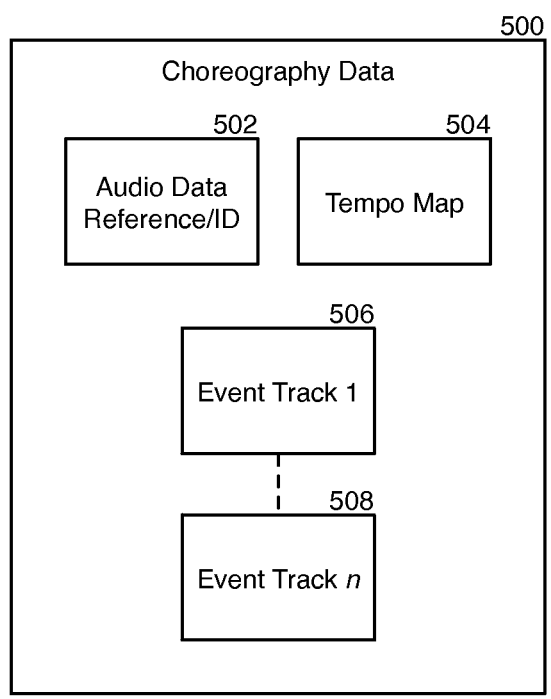
FIG. 5 is a graphical depiction of choreography data according to one or more aspects of the disclosure.

Referring now to FIG. 5, which is a graphical depiction of choreography data according to one or more aspects of the disclosure, the choreography data 500 can include a unique audio data reference ID 502. This identifies the particular audio file associated with the particular choreography data. If desired, the choreography data can also include a tempo map 504, as described above. The choreography data 500 can also include one or more event tracks 506-508 for defining particular events and, if desired, payloads at particular sample values.

Figure 6:
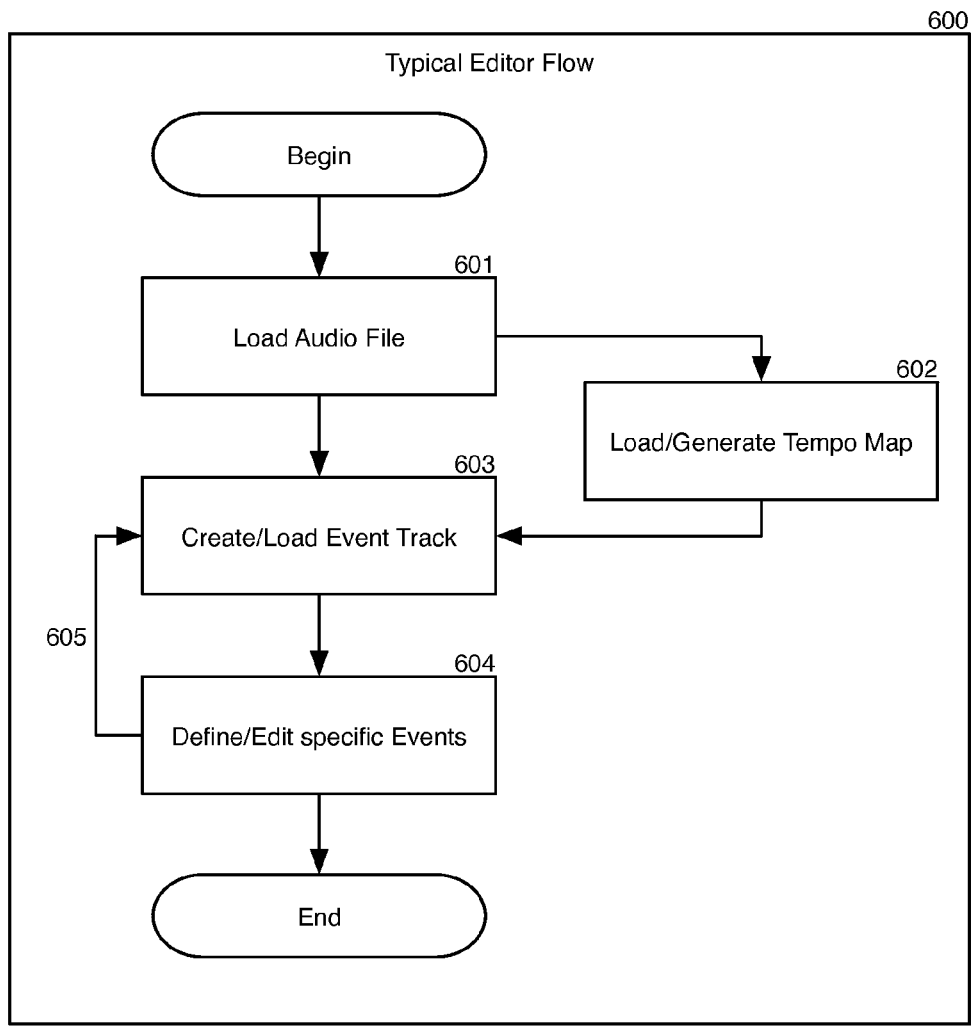
FIG. 6 is a flow chart depicting a method of generation of choreography data according to one or more aspects of the disclosure.

FIG. 6 is a flow chart depicting a method 600 of generation of choreography data according to one or more aspects of the disclosure. At block 601, a user may load an audio file, such as Beethoven's Ninth Symphony in the example above. At block 602, a user may load or generate a tempo map. Block 602 is optional, and choreography data can be generated without first, or at all, defining a tempo map at block 602. At block 603, a user may load and/or create an event track. The user may then define or edit specific events in the event track, such as by making sample selections to create events and assigning payloads. Once the events are configured, the choreography data is ready to be exported for implementation during runtime in a runtime application.

Figure 7:
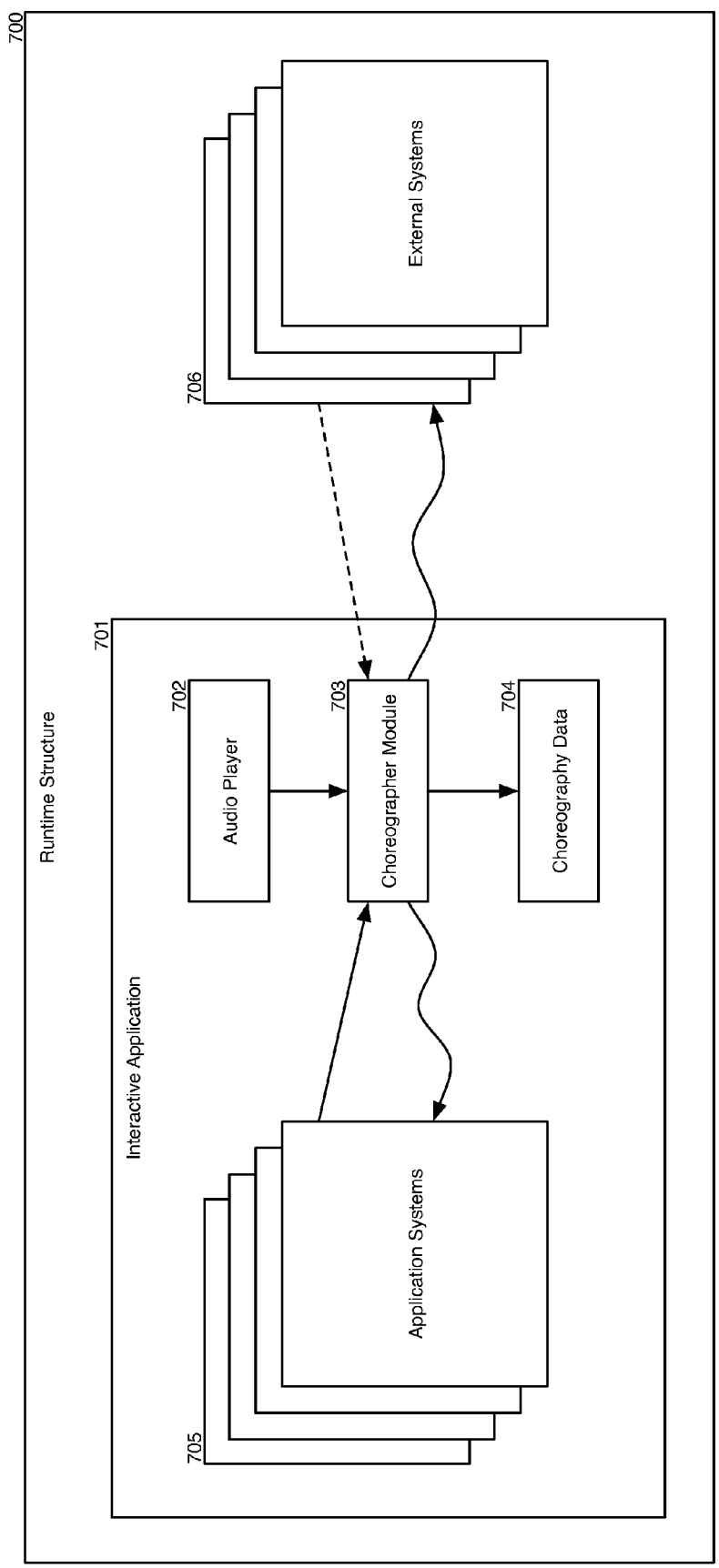
FIG. 7 is a block diagram of a runtime environment according to one or more aspects of the disclosure.

FIG. 7 is a block diagram of a runtime environment 700 according to one or more aspects of the disclosure. In this example, an interactive application 701 can be a set of program instructions executed by a processor of a computing device. The application 701 can include an audio player module 702 and a choreographer module 703. In other examples, the audio player module 702 and choreographer module 703 can be external applications that can be accessed by the application 701. The choreographer module 703 identifies an audio file currently being or to be played by the audio player module 702 by way of a unique identifier and correspondingly identifies appropriate choreography data 704 for the audio file. The choreographer module 703 can then deliver payloads according to the events and payloads defined in the choreography data 704. Such payload delivery can be accomplished by the choreographer module accessing certain functions of the interactive application, such as one or more application systems 705, or by access to external systems 706. In other examples, a plurality of audio modules and/or a plurality of choreographer modules can exist within the same or external applications. One such example may be an interactive multiplayer computer game wherein a choreographer module exists for each player, with each such choreographer module receiving a unique set of choreography data.

Figure 8:
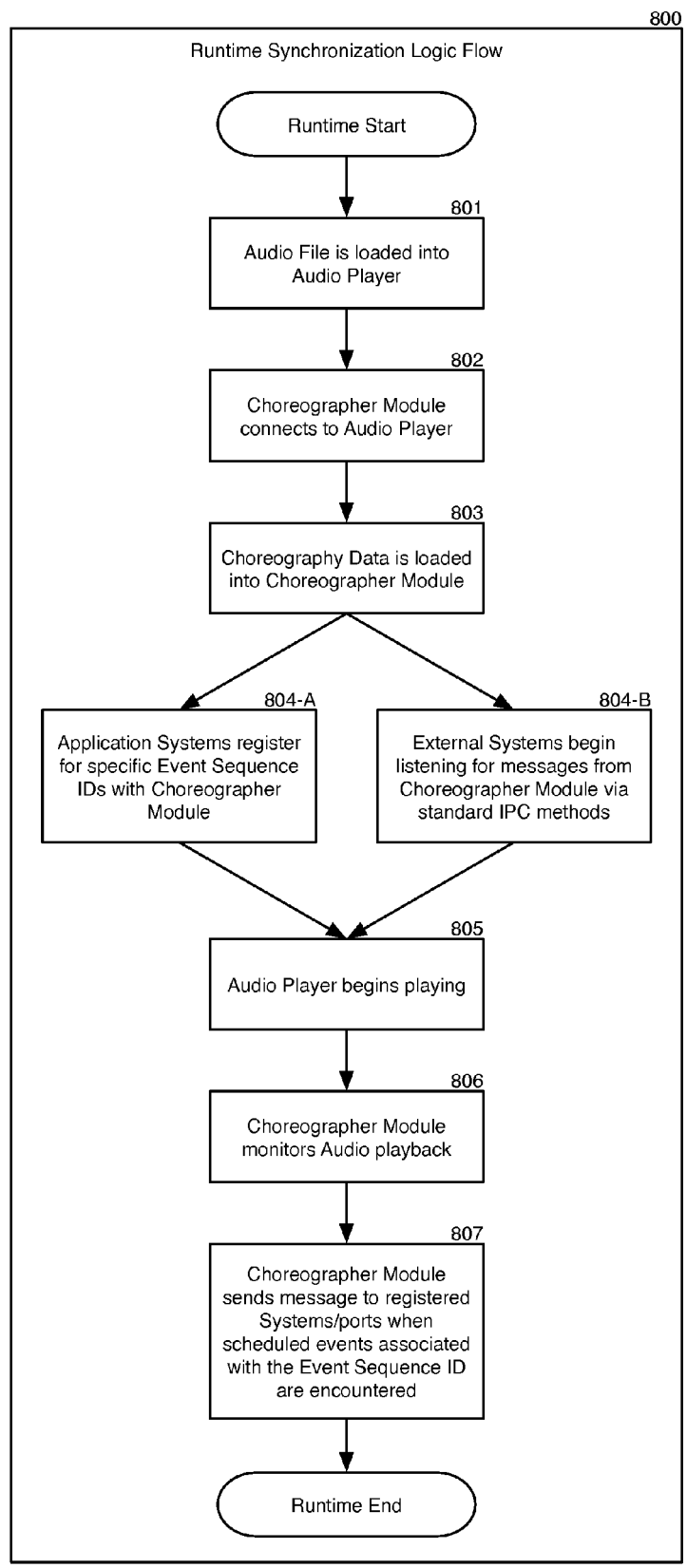
FIG. 8 is a flow chart depicting a method of runtime synchronization of an audio file with an interactive media, such as a computer game.

FIG. 8 is a flow chart depicting a method 800 of runtime synchronization of an audio file with an interactive media, such as a computer game.

At block 801, an audio file is loaded into an audio player module. As described above, the audio file can be any type of audio file, such as *.wav, *.mp3, *.mid, etc. The audio file can also have a unique audio data reference ID.

At block 802, a choreographer module establishes a connection with the audio player. In some embodiments, the choreographer module and the audio player module may be integrated into a single module.

At block 803, the choreography data is loaded into the choreographer module. As described above, such choreography data can include an audio data reference ID, a tempo map, and one or more event tracks. Choreography data with an audio data reference 502 that matches the recently loaded audio file is loaded into the choreographer module 803. It is contemplated that any number of audio files can be loaded into the audio player module at block 801 and any amount of choreography data can be simultaneously loaded into the choreographer module at block 803. Further, the audio files and corresponding choreography data may be mixed, shuffled, loaded, unloaded, etc. in accordance with the desired designs of the runtime application. In some examples, a single audio file can correspond to a single choreography data file or a plurality of choreography data files.

At block 804-A, one or more application systems register for specific event sequence IDs with the choreographer module. Other modules or systems within the runtime application connect to the choreographer module and register to receive messages about a specific set of event sequence IDs 804-A.

At block 804-B, one or more external systems begin listening for messages from the choreographer module, such as via Inter-Process Communication systems. Optionally external systems, those existing outside of the runtime application and, in some embodiments, outside the computer that is hosting the runtime application, begin listening for messages from the choreographer module via Inter-Process Communication at block 804-B.

The steps at blocks 804-A and 804-B can be performed separately, one at a time, consecutively, alternatively, or any other variation. That is to say, in some examples, the choreographer module communicates with application systems, while in other examples the choreographer module communicates with external systems, and in yet another example the choreographer module can communicate with both.

At block 805, the audio player module begins playing the audio file. Such audio can be played aloud for the user via speakers that can be operably coupled to the computing device.

At block 806, the choreographer module monitors the audio playback and compares the current audio file sample value to the sample values from the event tracks. The choreographer module monitors the audio playback at a rate determined by the runtime application.

At block 807, the choreographer module can send a message to registered systems and/or ports when scheduled events with the event sequence ID are encountered.

In one embodiment, the interactive application may be a computer game. As with most applications, computer games feature a core loop that is used to synchronize systems and process game logic.

Figure 9:
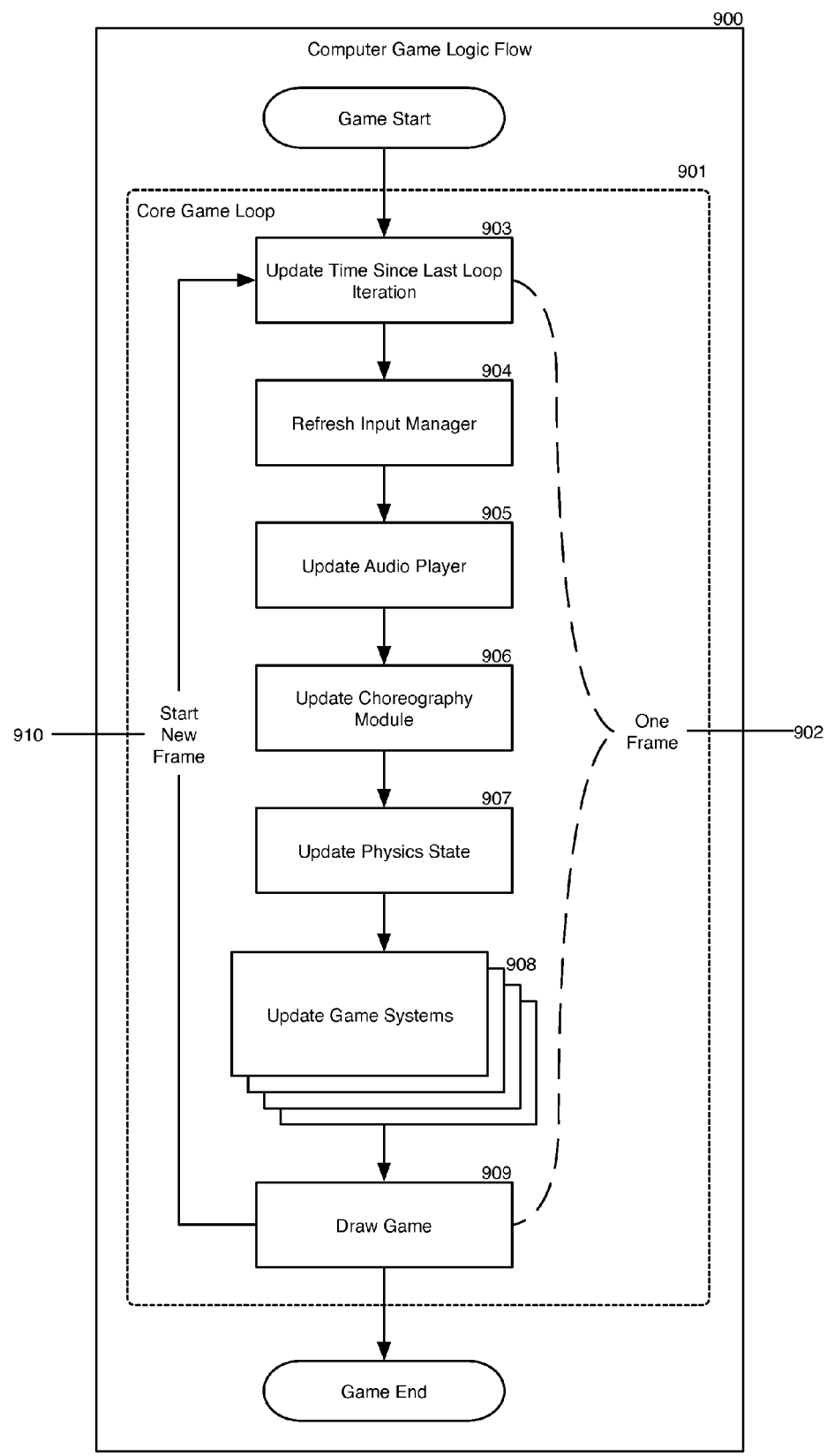
FIG. 9 depicts an example of a core loop of a computer game.

FIG. 9 depicts an example of a core loop 901 of a computer game. Games processing is broken up into frames, much like animation. Each iteration of the core loop is considered a single frame 902. The core loop processing may start with comparing the current time to the time of the beginning of the previous frame 903. This difference in time is typically called the delta time and is used by various systems throughout the processing of a frame as will be discussed below.

The game may then refresh the input state 904, for example through an input manager system. The input manager may query connected devices such as keyboard, mice, controllers, etc. to detect any changes to input that further systems may depend upon.

The game may then refresh the audio state 905 through an audio player module. This system may refill audio buffers as requested by an audio driver, update volume, load/unload an audio file, etc.

The game may then refresh the choreographer module 906. The choreographer module may query the audio player module for updated audio state information and send out event messages as necessary.

The game may then refresh the physics state 907. This may move game objects around within a level or trigger physics events such as collision events.

The game may then continue to update game systems 908 such as player control, enemy AI, player and enemy health, weapon systems, etc. These systems may perform calculations that depend on input, messages, or state of previously updated systems such as the delta time, the audio state, the input state, choreography messages, or physics state.

The game may then draw the current state of all visible objects to the display 909, which is what the player of the game will actually see.

If specific input was received to cause the game to end, the game may end. In the absence of such an event, however, the core game loop will iterate, beginning the processing of a new frame 910 at which point this process repeats.

Figure 10:
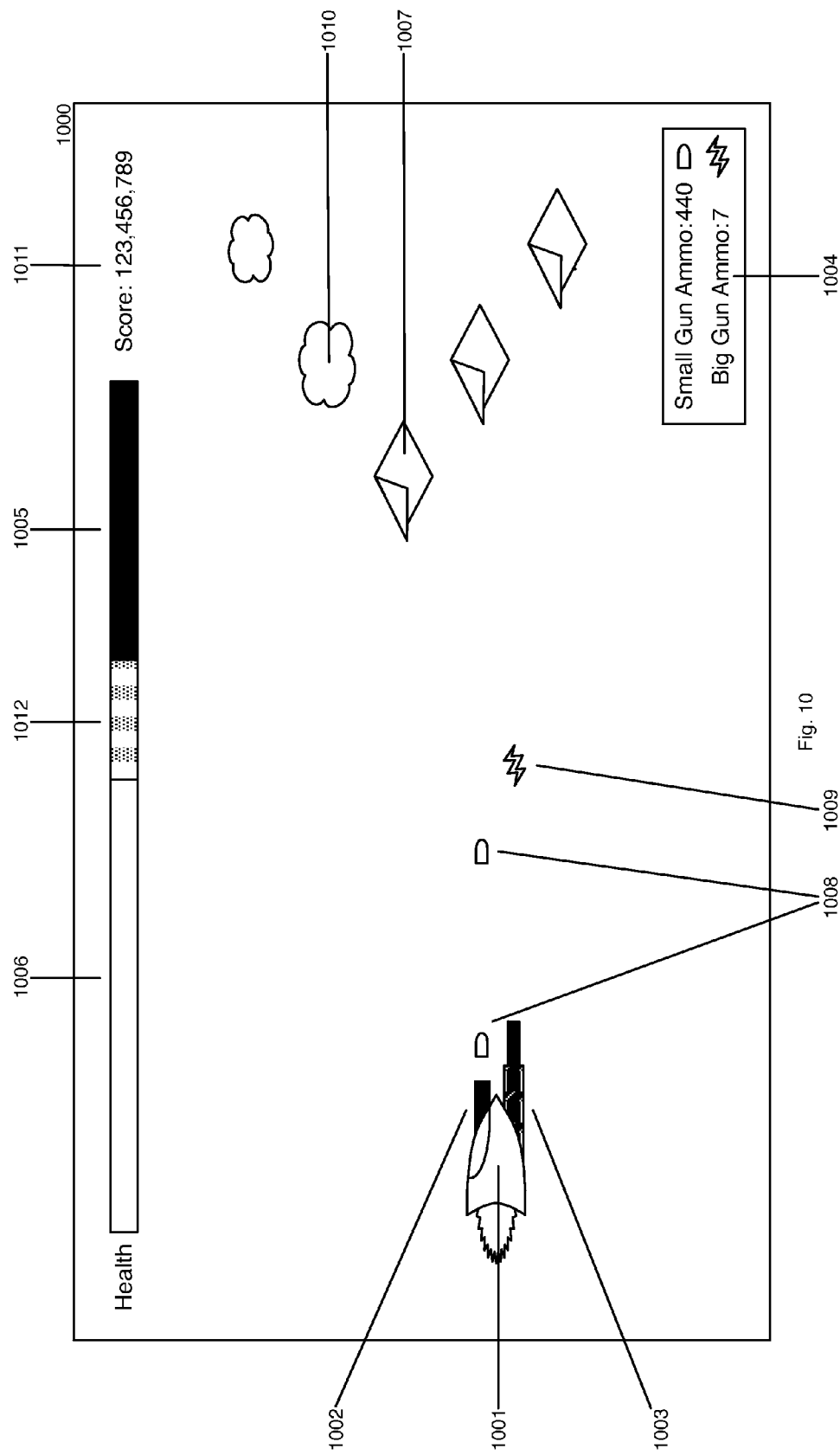
FIG. 10 is a graphic user interface of a side-scrolling shooter game.

FIG. 10 is a graphic user interface of a side-scrolling shooter game. In this game, the player controls a spaceship 1001 through input devices such as a game controller, joystick, mouse, etc. The spaceship is configured with two weapons: a small gun 1002 and a large gun 1003. A user interface (UI) element in the screen displays the amount of ammunition left in each weapon 1004. The player's remaining health, or how much damage their ship can sustain before it explodes and the game ends, is depicted as a health bar at the top of the screen, with the dark area depicting depleted health 1005 and the light area the remaining health 1006. The player is damaged when they are hit by enemy 1007 fire. If the player can do enough damage to an enemy with their weapons 1008, 1009 then the enemy is destroyed, an explosion animation plays 1010, and the player's score 1011 increases based on the number of points assigned to that enemy.

Figure 11:
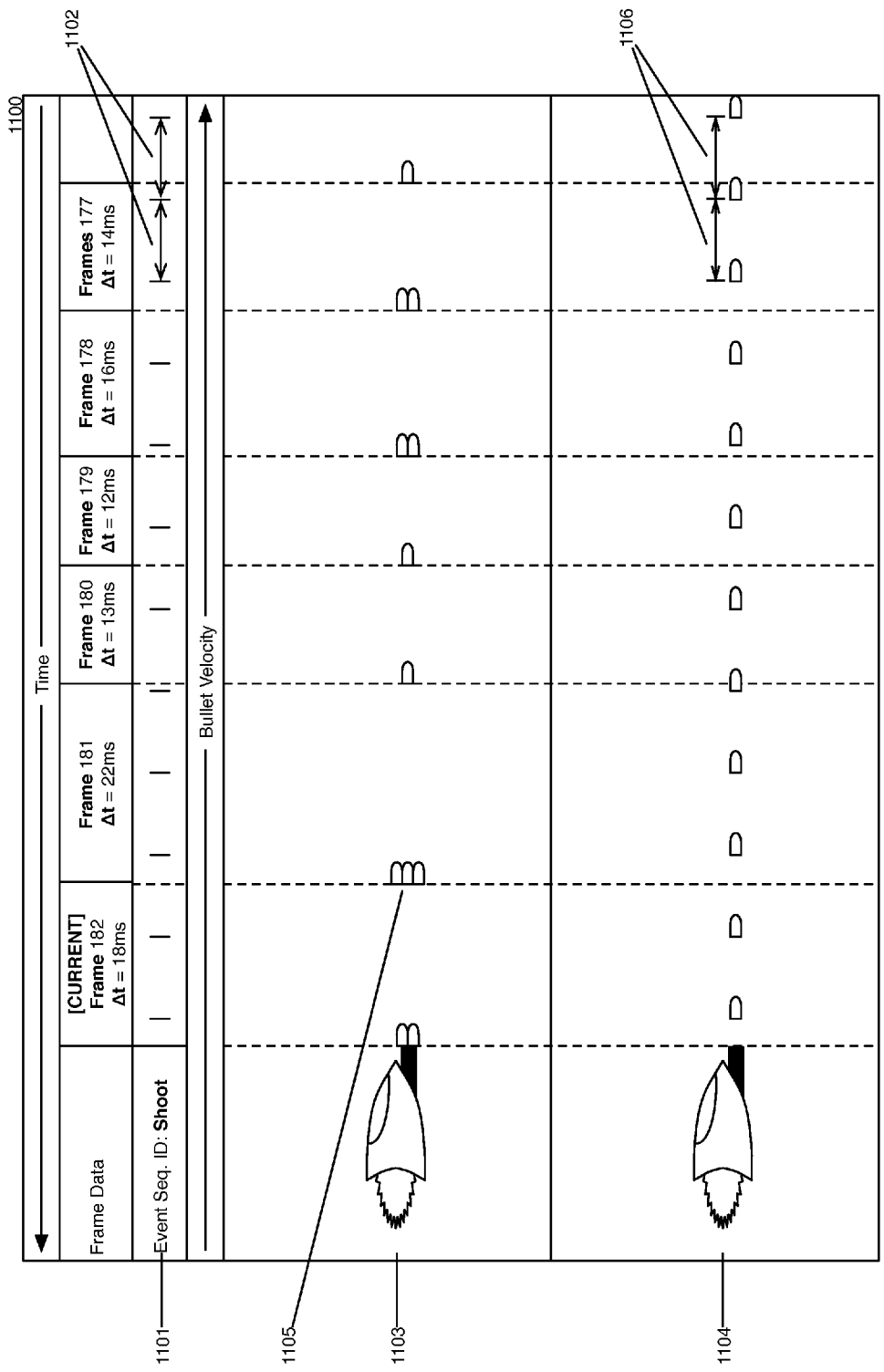
FIG. 11 is a visualization of a comparison between interactive media systems that does not use metadata versus systems that use metadata according to one or more aspects of the disclosure.
Figure 12:
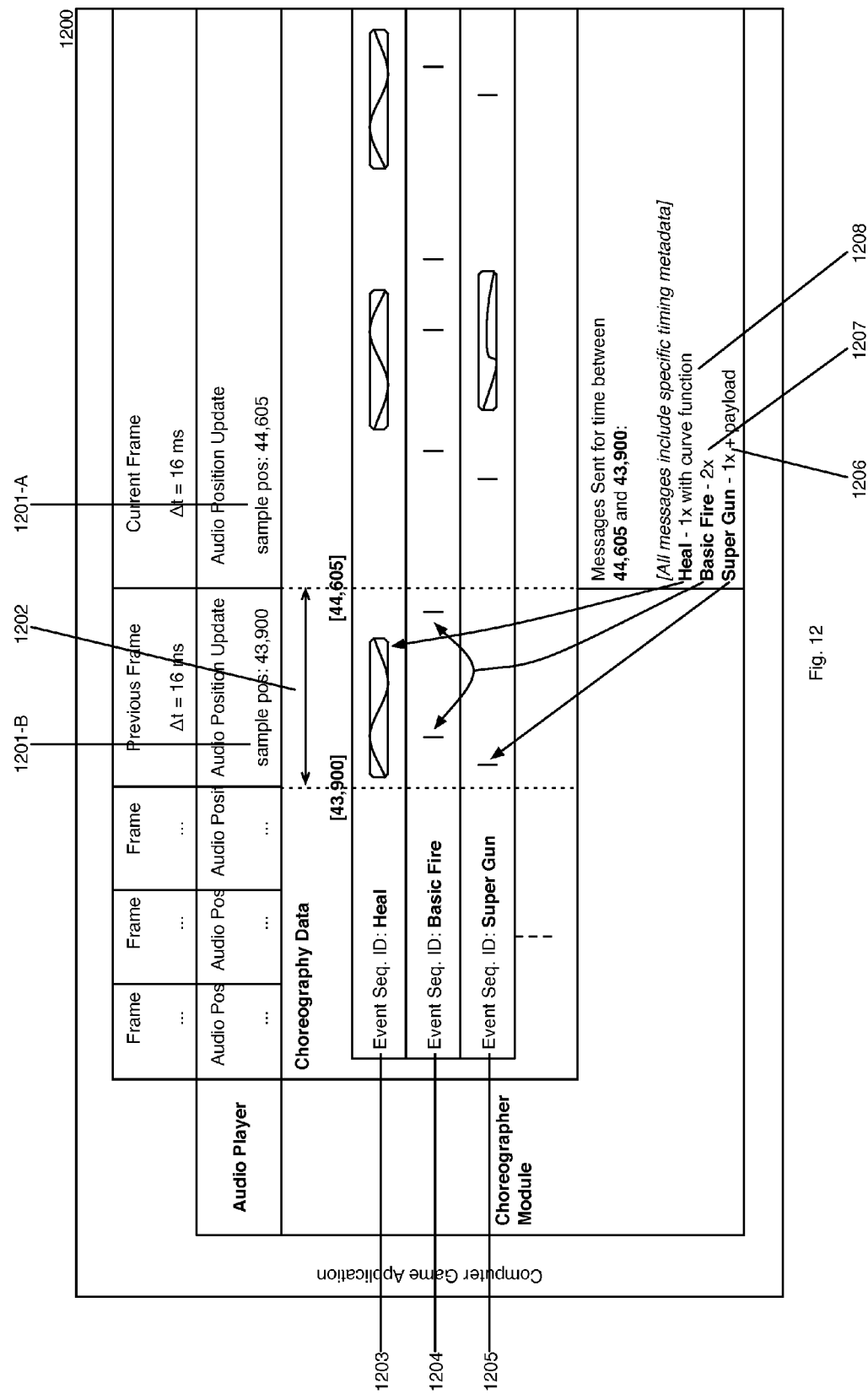
FIG. 12 is a schematic diagram of a runtime application depicting event synchronization according to one or more aspects of the disclosure.

FIG. 11 is a visualization of a comparison between interactive media systems that does not use metadata versus systems that use metadata. FIG. 12 is a schematic diagram of a runtime application depicting event synchronization according to one or more aspects of the disclosure. In one runtime application example, the interactive media can be the spaceship game previously described where systems are given a small slice of time to run between visual frame updates. In this example, the choreographer module may compare the current audio playback position 1201-A reported by the audio player in the current frame with the audio playback position 1201-B from the beginning of the previous frame, defining a slice of audio time, e.g., the delta time. The choreographer module then compares the audio playback position 1201-B and the audio playback position 1201-A with the loaded choreography data 1202. In the example of FIG. 12, several events exist between the audio playback position 1201-B and 1201-A in event tracks with sequence IDs "Heal" 1203, "Basic Fire" 1204, and "Super Gun" 1205. The choreographer module prepares a message for each such event 1206, 1208, and may send multiple messages within a single event track if more than one event is defined within the current slice of audio time 1207. These messages, which may include payloads specified by the associated event, are sent by the choreographer module to other systems within the game application that registered for the event sequence IDs.

In the spaceship game example, the health system of the spaceship game may have registered to listen to the event track with sequence ID "Heal" 1203. The health system would then receive a message with a curve function 1208, which in this example is a sinusoidal curve function. The health system may evaluate the curve function and apply the resulting value to the player's health total, increasing the health bar by a specific amount 1012 in that frame. In this manner, the player's health may recharge along with the music of the game. For example, the sinusoidal curve function includes one or more maxima and one or more minima. The rate at which the health is increased can correspond to a value of the function at that particular sample time, or the health system can increase the player's health by an amount corresponding to the integral of the range of the curve specific by the current slice of audio time.

Continuing with the spaceship game example, the player weapon system may have registered to listen to event tracks with sequence ID "Basic Fire" 1204 and "Super Gun" 1205. The player ship 1001 is outfitted with two guns: the small gun 1002 and the big gun 1003. The player weapon system may receive both "Basic Fire" messages 1207 and trigger a "fire weapon" action for each, resulting in the player ship firing two bullets 1008.

The choreographer module may send metadata about an event, along with the event and payload information, to an application system of the interactive media or to an external system. The metadata can include timing information about specific position within the current slice of audio time for each of the events that fall within the time slice. The respective system can adjust its output according to the timing information.

For example, the player weapon system may use the timing information to offset the bullets upon receipt of the "Basic Fire" message(s) 1207. In this regard, the player weapon system may display the bullets in the context of the game such that the bullet corresponding to the later timed "Basic Fire" event appears closer to the spaceship and the bullet corresponding to the earlier timed "Basic Fire" event appears further from the spaceship. While displaying the bullets from the previous time slice, the player weapon system can offset them from one another on the screen at a distance corresponding to the difference between the respective sample values at which they fall during the time slice. That is to say, with the bullets traveling at a predetermined speed on the screen and a known sample value difference (corresponding to time), an offset distance between the two can be determined and can be used to accurately position the bullets in the context of the game. While the above example describes bullets, it is contemplated that any system can provide output corresponding to sample difference values between events that occur in previous time slices.

The metadata can also include the CPU clock time of the message itself in addition to the above. The payload messages have their own transit time and any delay in message delivery due to transit time may be mitigated by ensuring a timestamp exists, such as CPU clock time, for each message. The CPU clock time can be an agreed upon clock time when the systems are operating on a single device. In this case, the interactive media can add the timestamp for the beginning of the frame—a time corresponding to the audio position update process. Then, the external application can unpack the message, compare that timestamp with the current time reported by the CPU and adjust any offset accordingly. In another embodiment, the metadata may include the sample rate of the audio file which can be used by an external application, perhaps in conjunction with other timing information in the metadata, for its purposes such as in adjusting a displayed element. In other examples, if the transit time is too long, the external systems may ignore messages as being delivered too late after the associated event has ended.

Similarly the player weapon system may receive the "Super Gun" event message 1206 sent by the choreographer module and trigger the big gun to fire 1009. The payload of the event may be a number that represents the power or intensity of the bullet fired by the big gun. As with the small gun bullets 1008, the big gun bullet may be offset from the spaceship by a distance relative to its audio sample value within the slice of audio time for the current frame. In this manner, the player's weapons will appear to automatically fire synchronized with the music of the game.

FIG. 11 is a visualization of a comparison between interactive media systems that does not use metadata versus systems that use metadata. Continuing with the spaceship game example, a different weapon system may listen for event sequence ID "Shoot" 1101. In this example, events in the event track 1101 are spaced equally apart at a continuous, constant rate 1102. The player weapon system may fire a bullet for each message with this event sequence ID sent by the choreographer module. In the top half of the visualization 1103, the player weapon system ignores the audio position metadata. In the bottom half of the visualization 1104, the player weapon system uses the audio position metadata to adjust the position of each bullet, offsetting it by an amount relative to the event's specific position within the slice of audio time for the currently processing frame. In the top example, the bullets are grouped together at the beginning of each frame, being instructed to simply "start this frame" 1105. In the bottom system, the bullets are individually offset based on the audio position metadata, resulting in constant even spacing 1106, as specified by the timing of the original events 1102. In this manner the player weapon system in the bottom visualization version can produce an experience that feels eminently synchronized with the music, regardless of fluctuations in the frame rate of the application. Of course, in some examples, the plurality of events with associated metadata may produce results like that in the top half of the visualization 1103 by intentionally grouping a subset of events at a particular sample value.

The choreographer module may send event messages 1206, 1207, 1208 to systems hosted in other applications on the same or different computers/devices. Continuing with the spaceship game example, the choreographer module may send messages for events in the event track with sequence ID "Super Gun" 1205 to external systems 706 via Inter-Process Communication channels. A process separate from the spaceship game application, on the same computer, or on a remote computer, may be listening for such messages. When this process receives the message it may turn on an external LED and set the color based on the contents of the payload. In this manner, the player will see lights external from the computer turn on, off, change color, etc. in time with the game music.

Depending on their start sample and end sample settings, specific events may have a range that extends across a considerable section of the related audio file. In one embodiment the payload for such an event may be an animation curve. This curve could be evaluated each time the choreographer module sends a correlated message to registered systems. Such messages could thus include the curve and the value that results from evaluating the curve at the current audio position, as well as other metadata.

In one embodiment the choreographer module may also load the tempo map 504 information stored in the loaded choreography data to provide standard musical timing information such as "time in beats" or "time in measures/bars". The choreographer module could thus provide a "musical delta time" similar to the standard system delta time calculated at the beginning of each core game loop iteration 903. Elements within a game could thus be made to animate to the beat of the song. Continuing with the spaceship game example, the score 1011 could animate its size, magnitude, or value along with the beat of the song, making it grow bigger at the beginning of a beat and slowly return to normal right before the next beat's timing.

In this manner game systems and other processes receive continuous input that can be used to adjust anything germane to the receiving system. Similarly, if no events are defined for a given point or range of time, the choreographer module will not send out any messages.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the present system(s) and/or method(s) can be used in any interactive media where it is desirable to synchronize interactive events with audio, such as computer and video games, digital toys, electronic toys, live music performance applications such as DJ mixing software, multimedia presentation software, video editing software, animation software, etc. Accordingly, this description is meant to be taken only by way of example, and not to otherwise limit the scope of this invention.

What is claimed is:

1. A method of using an interactive media application, comprising:

receiving choreography data, the choreography data comprising at least one event, and at least one payload corresponding to the at least one event;

playing an audio file via an audio module, the choreography data including a unique identifier associated with the audio file and being distinct from the audio file;

monitoring, via a choreographer module, a position of the audio file, the choreography module being distinct from the audio module;

comparing, via a processor, the monitored position of the audio file to at least one event start position corresponding to the at least one event;

delivering, via the choreography module, the payload when both (a) the at least one event start position is less than the monitored position of the audio file and (b) an event end position is greater than or equal to a previously monitored position of the audio file, wherein the payload is processed in an offset manner corresponding to an event position offset over a range of time.

2. The method of claim 1, wherein the monitored position comprises a range of a plurality of sample values corresponding to a frame of the interactive media.

3. The method of claim 2, wherein the at least one event comprises a plurality of events and the at least one payload comprises a plurality of payloads.

4. The method of claim 3, wherein the plurality of events each have event start positions that fall within the range of the plurality of sample values.

5. A method of using an interactive media application, comprising:
receiving choreography data, the choreography data comprising at least one event;
playing an audio file via an audio module, the audio file being distinct from the choreography data;
monitoring, via a choreographer module, a position of the audio file, the choreography module being distinct from the audio module;
comparing, via a processor, the monitored position of the audio file to at least one event start position corresponding to the at least one event;
delivering, via the choreography module, a message when both (a) the at least one event start position is less than the monitored position of the audio file and (b) an event end position is greater than or equal to a previously monitored position of the audio file, wherein the message is processed in an offset manner corresponding to an event position offset over a range of time.

6. The method of claim 1, wherein the range of time corresponds to a frame of interactive media.

7. The method of claim 5, wherein the monitored position comprises a range of a plurality of sample values corresponding to a frame of the interactive media.

8. The method of claim 7, wherein the at least one event comprises a plurality of events and the at least one message comprises a plurality of messages.

9. The method of claim 8, wherein the plurality of events each have event start positions that fall within the range of the plurality of sample values.

10. The method of claim 5, wherein the range of time corresponds to a frame of interactive media.

11. A system for using an interactive media application, comprising:
a memory having computer executable instructions stored thereon;
one or more processors that when executing the instructions are configured to:
receive choreography data, the choreography data comprising at least one event, and at least one payload corresponding to the at least one event;
play an audio file via an audio module, the choreography data including a unique identifier associated with the audio file and being distinct from the audio file;
monitor, via a choreographer module, a position of the audio file,
the choreography module being distinct from the audio module;
compare the monitored position of the audio file to at least one event start position corresponding to the at least one event;
deliver, via the choreography module, the payload when both (a) the at least one event start position is less than the monitored position of the audio file and (b) an event end position is greater than or equal to a previously monitored position of the audio file, wherein the payload is processed in an offset manner corresponding to an event position offset over a range of time.

12. The system of claim 11, wherein the monitored position comprises a range of a plurality of sample values corresponding to a frame of the interactive media.

13. The system of claim 12, wherein the at least one event comprises a plurality of events and the at least one payload comprises a plurality of payloads.

14. The system of claim 13, wherein the plurality of events each have event start positions that fall within the range of the plurality of sample values.

15. The system of claim 11, wherein the range of time corresponds to a frame of interactive media.

16. A system for using an interactive media application, comprising:
a memory having computer executable instructions stored thereon;
one or more processors that when executing the instructions are configured to:
receive choreography data, the choreography data comprising at least one event;
play an audio file via an audio module, the audio file being distinct from the choreography data;
monitor, via a choreographer module, a position of the audio file,
the choreography module being distinct from the audio module;
compare the monitored position of the audio file to at least one event start position corresponding to the at least one event;
deliver, via the choreography module, a message when both (a) the at least one event start position is less than the monitored position of the audio file and (b) an event end position is greater than or equal to a previously monitored position of the audio file, wherein the message is processed in an offset manner corresponding to an event position offset over a range of time.

17. The system of claim 16, wherein the monitored position comprises a range of a plurality of sample values corresponding to a frame of the interactive media.

18. The system of claim 17, wherein the at least one event comprises a plurality of events and the at least one message comprises a plurality of messages.

19. The system of claim 18, wherein the plurality of events each have event start positions that fall within the range of the plurality of sample values.

20. The system of claim 16, wherein the range of time corresponds to a frame of interactive media.

\* \* \* \* \*